United States Patent
Lutsenko et al.

(10) Patent No.: US 10,785,178 B2
(45) Date of Patent: Sep. 22, 2020

(54) IN-APPLICATION NOTIFICATIONS

(71) Applicant: Facebook, Inc., Menlo Park, CA (US)

(72) Inventors: Mykyta Lutsenko, Menlo Park, CA (US); Supratik Lahiri, San Francisco, CA (US); Fosco J. Marotto, San Francisco, CA (US); John Jacob Blakeley, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 344 days.

(21) Appl. No.: 15/284,757

(22) Filed: Oct. 4, 2016

(65) Prior Publication Data

US 2018/0097764 A1    Apr. 5, 2018

(51) Int. Cl.
| | | |
|---|---|---|
| *G06F 3/0484* | (2013.01) | |
| *H04L 12/58* | (2006.01) | |
| *H04L 29/08* | (2006.01) | |
| *G06F 3/0483* | (2013.01) | |
| *H04M 1/725* | (2006.01) | |
| *G06F 40/14* | (2020.01) | |
| *G06Q 30/02* | (2012.01) | |
| *G06Q 50/00* | (2012.01) | |

(52) U.S. Cl.
CPC ............ *H04L 51/24* (2013.01); *G06F 3/0483* (2013.01); *G06F 3/0484* (2013.01); *G06F 40/14* (2020.01); *H04L 51/32* (2013.01); *H04L 67/20* (2013.01); *H04L 67/26* (2013.01); *H04M 1/72519* (2013.01); *G06Q 30/0269* (2013.01); *G06Q 50/01* (2013.01); *H04M 1/72552* (2013.01)

(58) Field of Classification Search
CPC ........ G06F 3/048; G06F 3/0483; G06F 40/14; G06F 3/0484; H04M 1/72519; H04M 1/72552; G06Q 30/0269
See application file for complete search history.

(56) References Cited

U.S. PATENT DOCUMENTS

| 7,250,955 B1* | 7/2007 | Beeman ................. G06F 9/542 345/592 |
|---|---|---|
| 2001/0052006 A1* | 12/2001 | Barker ............... H04L 41/0213 709/223 |
| 2003/0177247 A1* | 9/2003 | Dunning ................ G06Q 30/02 709/228 |
| 2006/0080619 A1* | 4/2006 | Carlson .................. G06Q 10/10 715/781 |
| 2012/0158511 A1* | 6/2012 | Lucero ............... G06Q 30/0251 705/14.64 |
| 2013/0031199 A1* | 1/2013 | Clerc ................ H04L 29/08729 709/213 |
| 2014/0068692 A1* | 3/2014 | Archibong .......... H04L 65/4084 725/116 |

(Continued)

*Primary Examiner* — Pei Yong Weng
(74) *Attorney, Agent, or Firm* — Baker Botts L.L.P.

(57) ABSTRACT

In one embodiment, a method includes receiving, by a mobile device associated with a user from one or more computing devices associated with a social-networking system, content for a notification and instructions to display the notification in a user interface of the application, and displaying the content for the notification as a structured card over a background in the user interface. The method may include detecting a user interaction with the notification. The method may then include sending information about the user interaction with the notification to a third-party server associated with the application.

26 Claims, 13 Drawing Sheets

(56) References Cited

U.S. PATENT DOCUMENTS

2014/0172911 A1* 6/2014 Cohen ................... H04L 67/42
  707/770
2014/0300465 A1* 10/2014 Putterman ............ G08B 27/008
  340/531

* cited by examiner

IN-APPLICATION NOTIFICATIONS

TECHNICAL FIELD

This disclosure generally relates to transmitting fully-featured rich notifications to users of client devices.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

When two electronic devices are connected to a network (e.g., a computer or communication network), data may be transmitted between the two devices over the network using one or more suitable network protocols. For example, in a client-server environment, data may be transmitted between a server and a client over a network to which both the server and the client are connected. Of course, a network may include any number of sub-networks. By transmitting data between the two devices, the two devices may communicate with each other.

In network communications, there are two ways to send a communication from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction.

SUMMARY OF PARTICULAR EMBODIMENTS

This disclosure generally relates to transmitting data between two electronic devices and more specifically relates to managing communications between a server and a client and transmitting data between the server and the client over a communication network.

In particular embodiments, a mobile device associated with a user may receive, from one or more computing devices associated with a social-networking system, content for a notification and instructions to display the notification in a user interface of the application, and display the content for the notification as a structured card over a background in the user interface. The mobile device associated with the user may then detect a user interaction with the notification, and send information about the user interaction with the notification to a third-party server associated with the application.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
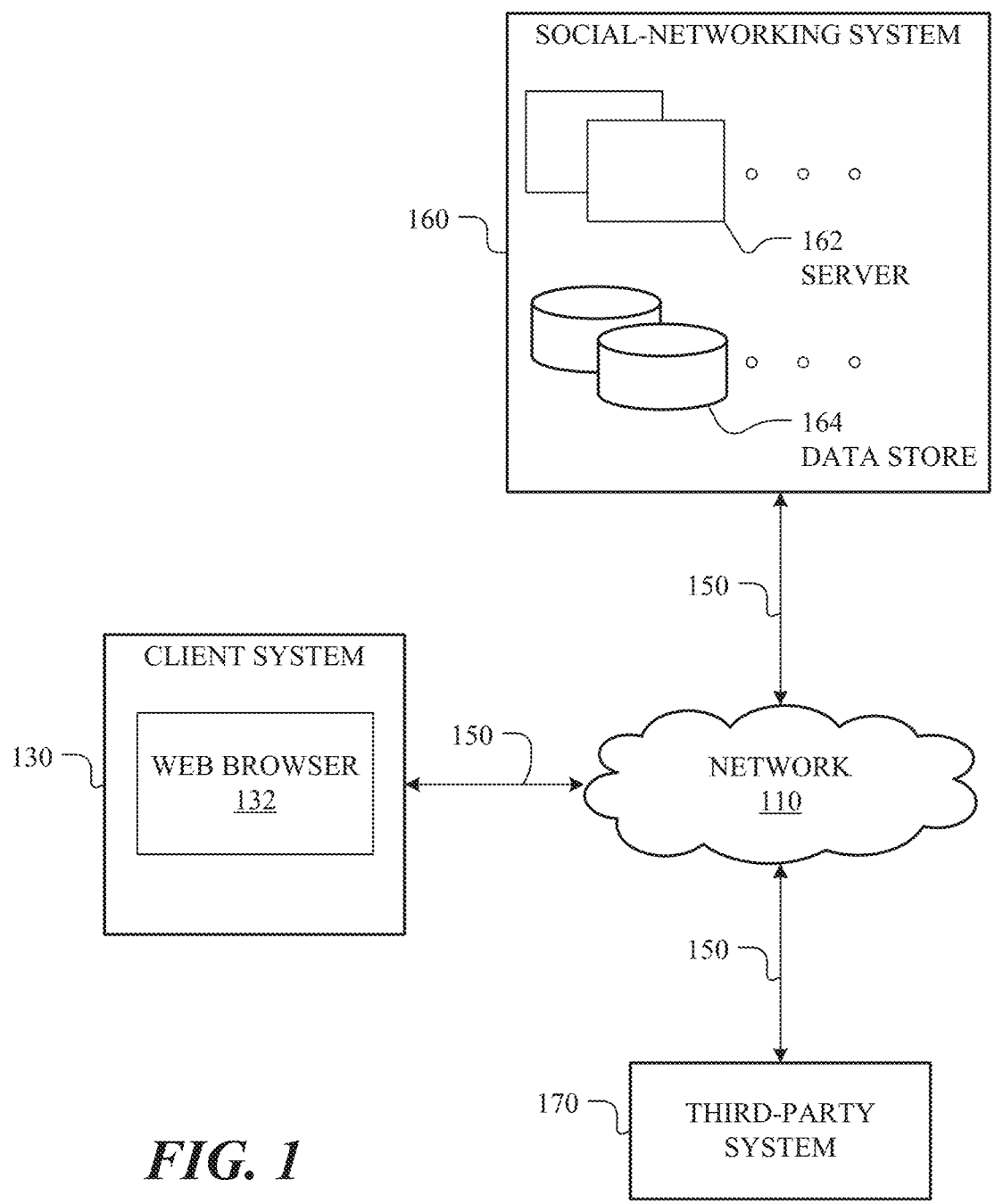
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
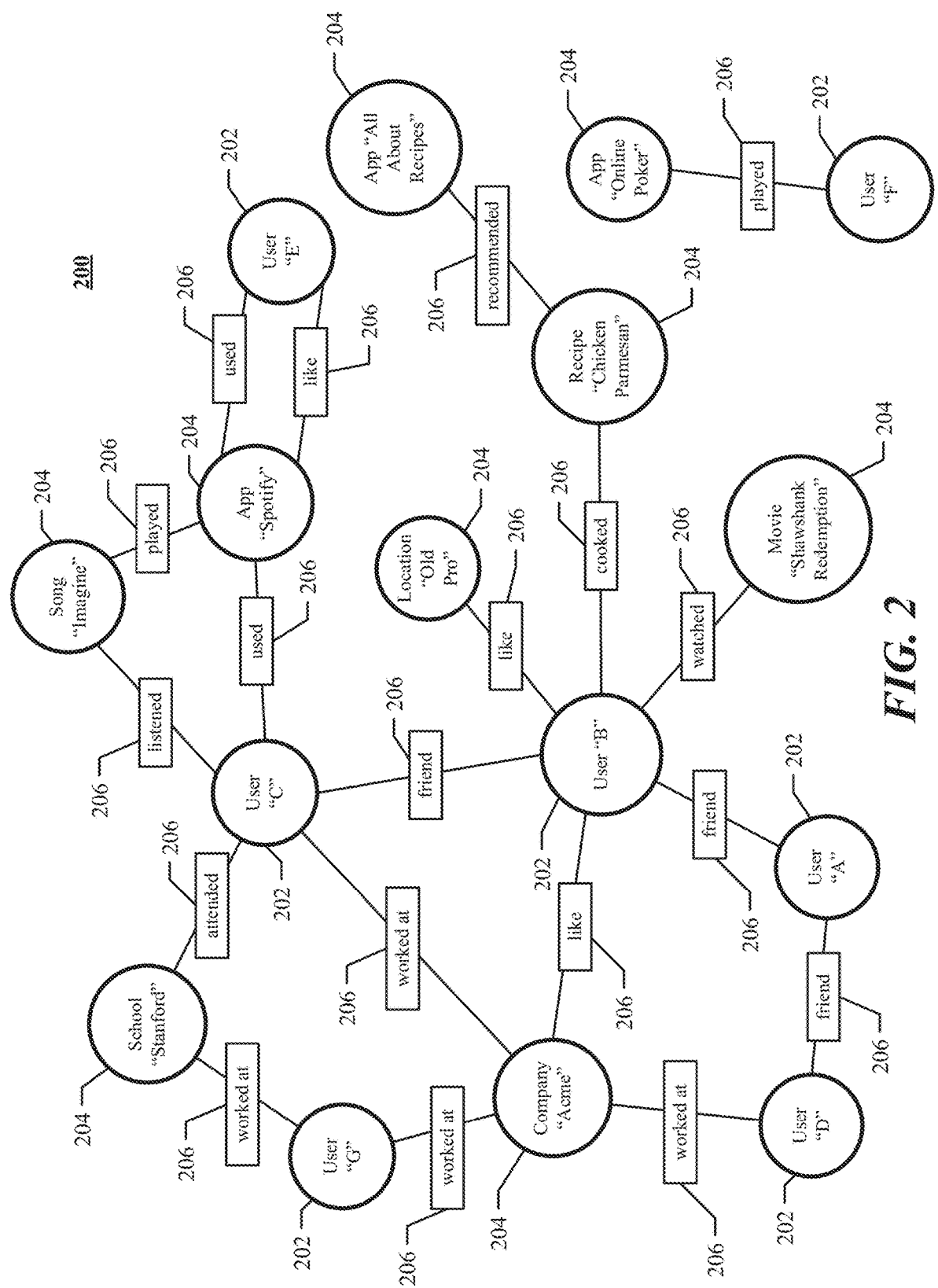
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Mobile Client System

Figure 3:
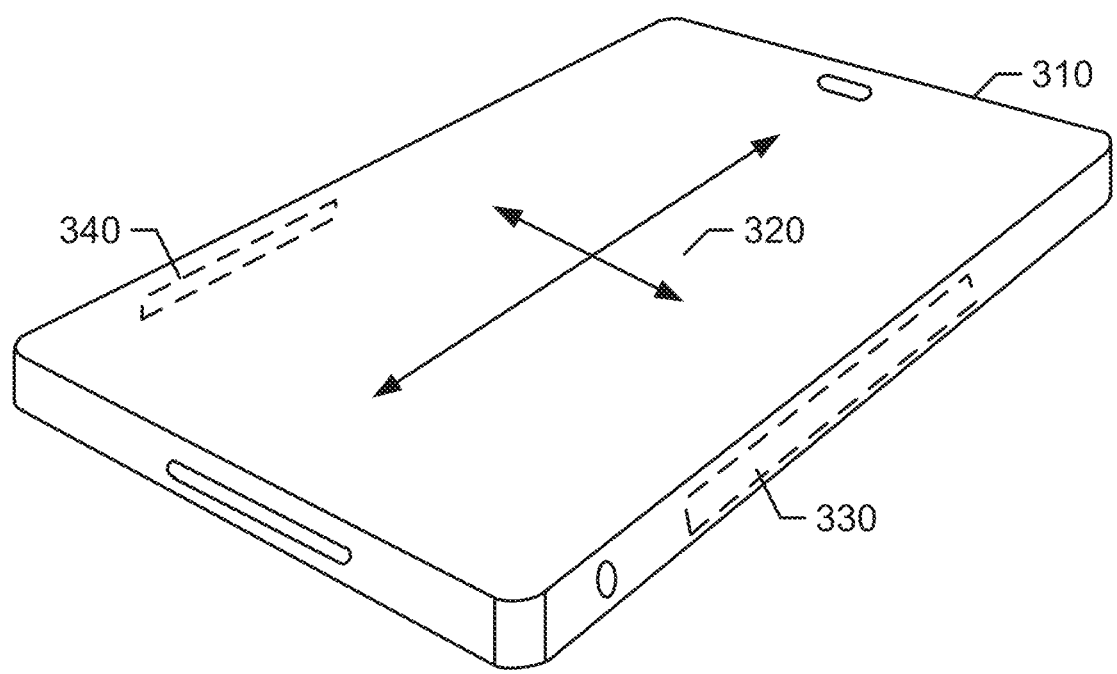
FIG. 3 illustrates an example mobile device.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a display screen 310 and a touch sensor 320 as an input component. In the example of FIG. 3, touch sensor 320 is incorporated on a front surface (e.g., display screen 310) of mobile client system 130. Touch sensor 320 may detect the presence and location of a touch (e.g., from a finger of a user) or the proximity of an object (e.g., a stylus). In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In particular embodiments, a user may be presented with a user interface ("UI") of one or more applications (e.g., mobile applications) on screen display 310 of mobile client system 130, and the user may interact with the UI of each of the applications via touch sensor 320.

In the example of FIG. 3, one or more antennae 330, 340 may be incorporated into one or more sides of mobile client system 130. Antennae 330, 340 are components that convert electric current into radio waves, and vice versa. During transmission of signals, a transmitter applies an oscillating radio frequency (RF) electric current to terminals of antenna 330, 340, and antenna 330, 340 radiates the energy of the applied the current as electromagnetic (EM) waves. During reception of signals, antennae 330, 340 convert the power of an incoming EM wave into a voltage at the terminals of antennae 330, 340. The voltage may be transmitted to a receiver for amplification.

In particular embodiments, mobile client system 130 many include a communication component coupled to antennae 330, 340 for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 330, 340 of mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

In-Application Notifications

In particular embodiments, one or more notifications may be delivered to client device 130. The notifications may include push notifications. As an example and not by way of limitation, there are various types of communications that may be pushed to a client device, such as advertisements, system update messages, software update messages, advertisements, alerts, user account notices, social-networking messages, service agreement updates, other suitable communications, or any combination thereof. This disclosure contemplates any applicable type of communications. A client device may be connected to a network via a wireless or wire-line connection using any suitable communication or network protocol (e.g., TCP/IP). In particular embodiments, the push notifications may be created by the network (e.g., the online social network) and delivered to client device 130 from the network. In particular embodiments, the push notifications may be created by a third-party entity (e.g., a developer), and then sent to the network to be delivered to client device 130. In particular embodiments, a communication pushed to a client may be referred to as a "push notification." An example push notification is a Short Message Service (SMS) notification. Another example of a push notification is an advertisement notification. Yet another example of a push notification is an in-application notification, as discussed below. The content of the individual notifications may vary. As an example and not by way of limitation, the content of a notification may concern an entity, which may a human or a non-human entity (e.g., an organization, a location, a product, a software application, a movie, a subject matter, etc.). A notification may originate from the social-networking system (e.g., notifications on social information or social connections) or from a third party (e.g., notifications on the third-party's products or services) via a third-party entity (e.g., the developer).

Figure 4:
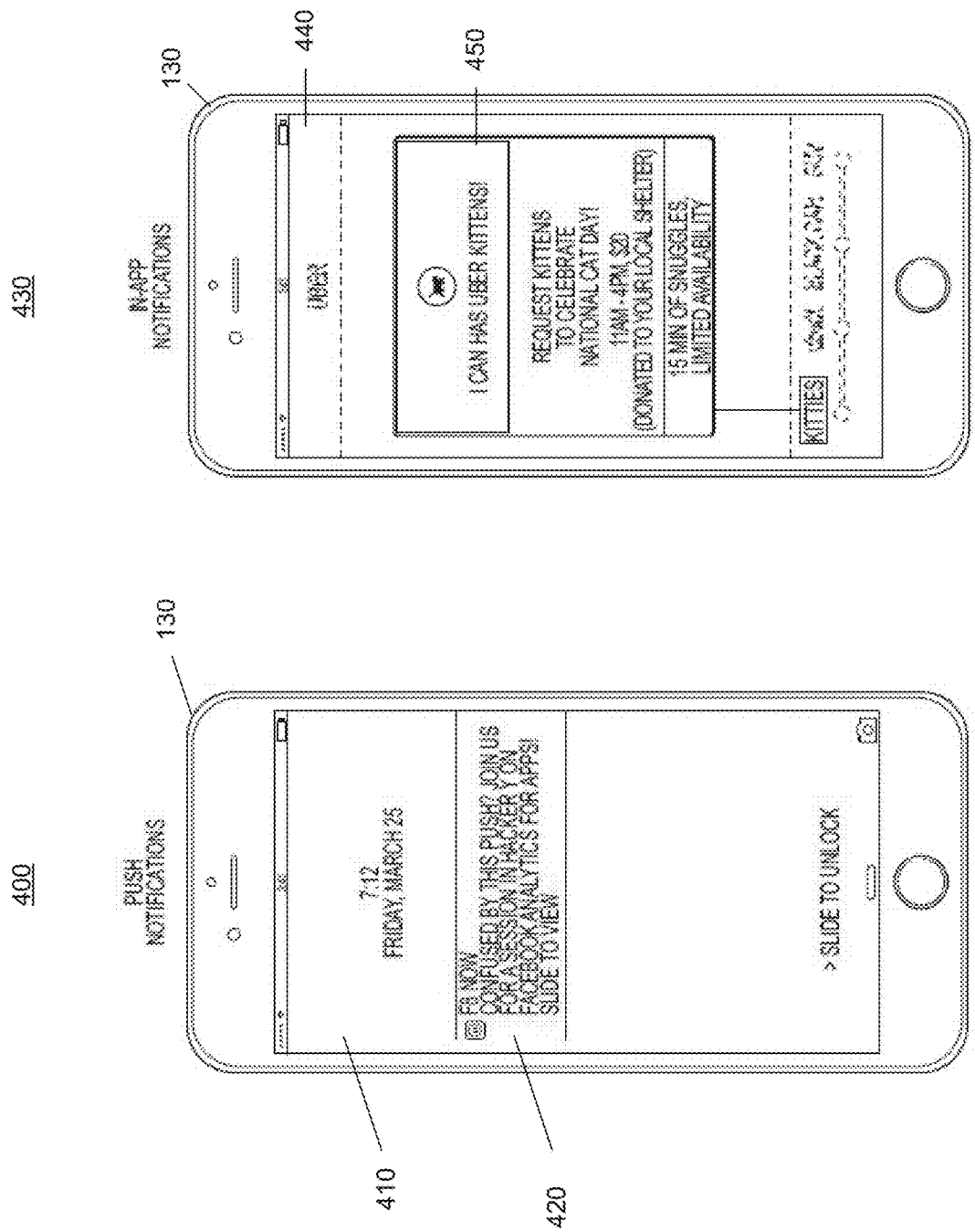
FIG. 4A illustrates an example of a push notification.
FIG. 4B illustrates an example of an in-application notification.

In particular embodiments, the user devices to which the notifications are pushed may be mobile devices (e.g., mobile telephones or tablet computers). As an example and not by way of limitation, notifications may be pushed to mobile client system 130. Based on the size of the display of a typical mobile device, the notifications may be displayed as overlays on a current interface view, as a notification message on a home screen and/or lock screen, or any other suitable display. FIG. 4A illustrates an example of a push notification user interface 400. As shown in FIG. 4A, client device 130 displays a background lock screen 410, and a push notification 420 is displayed over the background to the user. In particular embodiments, some push notifications may be interruptive and some may be non-interruptive. As an example and not by way of limitation, an interruptive push notification, when pushed to a client, may be presented to the user of the client immediately or soon after it is received by the client. Even if the user is performing other activities with the client, the activities may be interrupted and suspended by the interruptive push notification. The user may need to respond to the interruptive push notification first before she can continue with performing the other activities with the client. On the other hand, a non-interruptive push notification, when pushed to a client, may be stored on the client for some period of time before it is presented to the user of the client. A non-interruptive push notification typically does not require the user's immediate attention. Instead, the user may respond to it at leisure (e.g., when the user has time). Since this type of notification is typically less important than what the user is currently doing with his phone, it may not be desirable (e.g., considered too invasive) to interrupt the user's current activities.

In particular embodiments, when selecting specific notifications to be pushed to a specific user's device at specific times, the selections may be based on various factors. This disclosure contemplates any relevant factor. In particular embodiments, given a specific user and a specific time, one or more notifications (e.g., advertisement notifications) may be selected to be pushed to the user's device based on, without limitation, the current time (e.g., morning vs. afternoon vs. evening, or weekdays vs. weekends), the current location of the user (e.g., work vs. home, restaurant, shops, theater, etc.), which may be derived from the GPS coordinates or the communication signals of the user's device or the Internet Protocol (IP) address of the user's device, the current activity of the user (e.g., in a meeting, making a phone call, eating lunch or dinner, watching a movie, etc.), any other relevant parameters, or any combination thereof. The notifications may also be selected based on the user's social information or social activities. As an example and not by way of limitation, if the user takes any action (e.g., purchasing items or contents) in connection with an entity (e.g., a restaurants, shops, etc.) on the social-networking system, notifications about the entity may be pushed to the user's device from time to time. As another example and not by way of limitation, if the user has a close social connection (e.g., a family member or a friend), then notifications associated with the current status of the user's social connection (e.g., an advertisement relevant to the user and the user's social connection) may be pushed to the user's device from time to time. Each user has a set of social connections (e.g., families, friends, coworkers, business associates, etc.). Among them, the user may consider some of them more important than others. For example, a user may consider immediate family members (e.g., spouses, children, or parents) or long-term good friends more important than casual acquaintances. In particular embodiments, notifications relating to people who are closer or more important to a user may be pushed more frequently than those relating to people who are less important to the user. In addition, in particular embodiments, notifications relating to people who are closer or more important to a user may be designated as interruptive notifications, while notifications relating to people who are less important to the user may be designated as non-interruptive notifications.

In particular embodiments, advertisements may be pushed to a user's device if a specific user does not object to such kind of information or is interested in a particular product. As an example and not by way of limitation, if the user has mentioned a product in a message posted on the social-networking system, advertisements about that product may be pushed to the user's device. As another example and not by way of limitation, if the user is using an application related to a product (or products) or type of product, advertisements about that product or type of product may be pushed to the user's device. If the user has mentioned a person (e.g., expressing an interest or a liking in a celebrity), the current status of that person may be pushed to the user's device. If the user has indicated that he/she likes a particular entity (e.g., a product, a clothing designer, a type of clothing, a vacation spot, a place, a movie, a book, a celebrity, etc.), then notifications (e.g., advisements on sales, etc.) about the entity the user likes may be pushed to the user's device. If the user likes a web page (e.g., a webpage relating to particular product), then notifications about the entity with which the content of the web page is concerned may be pushed to the user's device. In particular embodiments, certain types of notifications (e.g., advertisements) may be pushed to a user's device less frequently than other types of notifications (e.g., messages from friends) to minimize user fatigue.

In particular embodiments, for a given user and a given notification, a relevance score may be computed for the notification with respect to the user, which indicates how relevant the notification is to the user. If the notification is considered relevant to the user (e.g., having a high relevance score), then the notification may be pushed to the user's device. Conversely, if the notification is considered not sufficiently relevant to the user (e.g., having a low relevance score), then the notification is not pushed to the user's device. In particular embodiments, the relevance score of a notification with respect to a user may be determined based on various factors, such as, without limitation, a content value, which is determined based on the content of the notification (e.g., the content of an advertisement, which may be based on the fees and/or potential revenue associated with the advertisement), a location value, which compares the location of the entity of the notification and the current location of the user, an interest value, which indicates whether the entity of the notification is or is not included in the user's interests, a time value, which determines whether the current time is within the delivery time range for the entity of the notification, and a connection value, which indicates the number of the user's social connections are associated with the entity of the notification. These different values may be combined to determine the relevance score. Computing notification relevance score is described in more detail in U.S. patent application Ser. No. 12/976,775, filed on Dec. 22, 2010, which is incorporated by reference in its entirety.

In particular embodiments, the push notifications may include in-application notifications. FIG. 4B illustrates an example of an in-application notification on user interface 430. As shown in FIG. 4B, and compared with push notification 420 shown in FIG. 4A, client device 130 displays a background application user interface 440, and an in-app notification 450 is displayed over the background application. This disclosure describes, without limitation, a method for delivering push notifications, and in particular, in-application notifications, to a client device that are rendered natively on the client device into fully-featured rich notifications with custom images, colors, timing/scheduling, and buttons. In particular embodiments, the content of the notification may be displayed as a structured card over a background in the user interface. In particular embodiments, the method for delivering push notifications may include receiving, from one or more computing devices associated with a social-networking system, content for a notification and instructions to display the notification in a user interface of an application. As an example and not by way of limitation, the content for the notification may be created using an online social network associated with the social-networking system. As another example and not by way of limitation, the content for the notification may be created by a third-party developer using a software development kit (SDK) associated with the online social network of the social-networking system.

Figure 5:
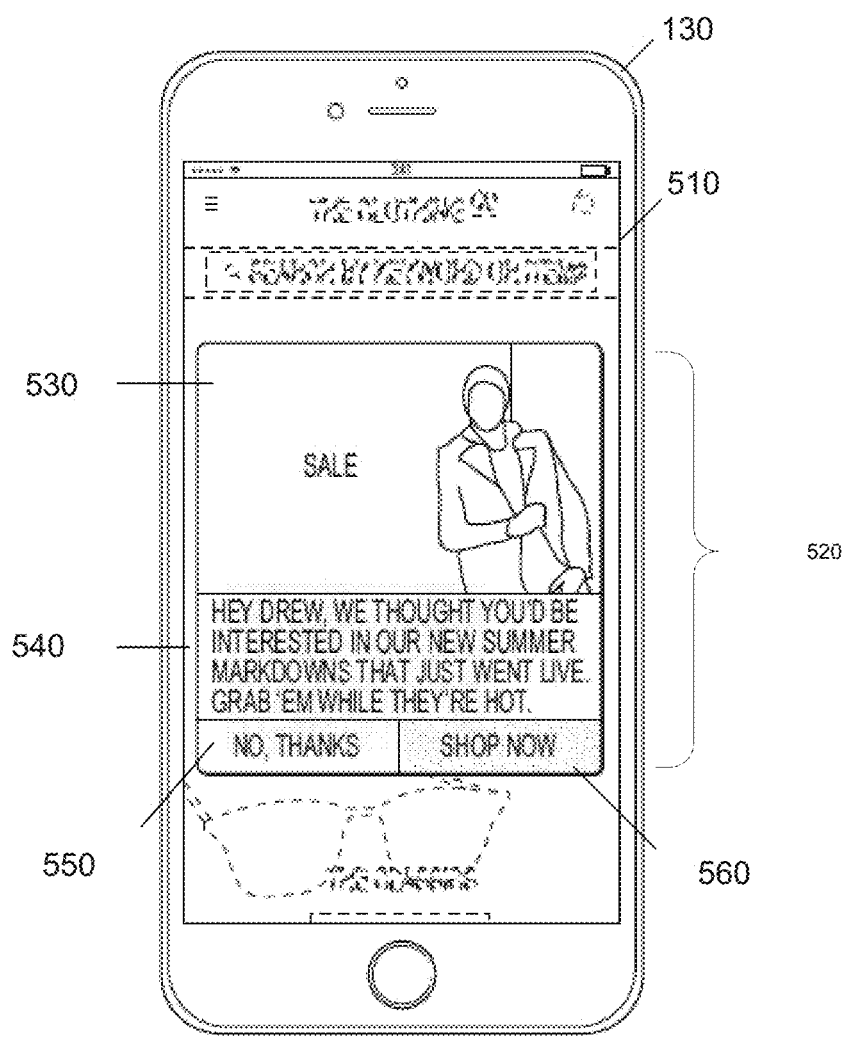
FIGS. 5-9 illustrate example user interfaces of in-application notifications.
Figure 6:
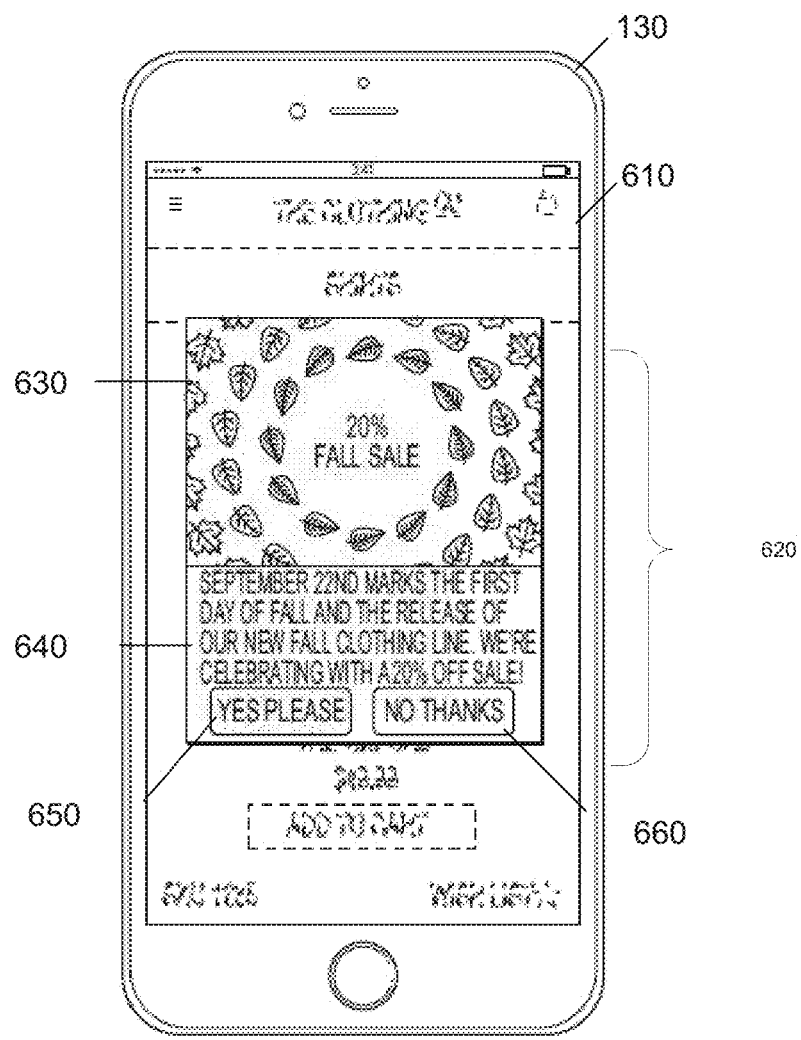

In particular embodiments, the method for delivering in-application notifications may include displaying the content for the notification as a structured card over a background application in the user interface. The background application may be associated with the online social network, or alternatively, may be associated with a third-party entity. FIGS. 5-9 illustrate additional example user interfaces of in-application notifications displayed as structured cards over a background in the user interface. In particular embodiments, an in-application notification may comprise a structured card that includes three user-interface parts: a hero (e.g., an image, a title, etc.), a body (including, e.g., a background), and one or more buttons (e.g., a user-interactive portion). FIG. 5 illustrates an example in-application notification interface 500 presenting a notification of a sale to the user while the user is using an application associated with "The Clothing Company." As shown in FIG. 5, client device 130 may display a background application user interface 510 (e.g., the application user interface for "The Clothing Company") and an in-application notification 520 (e.g., a notification providing information on a clothing sale for The Clothing Company). In-application notification 520 may include a hero portion 530 (e.g., an image of a model wearing The Clothing Company's clothing and a title of "Sale"), a body portion 540 (e.g., a background comprising a message to the user regarding the clothing sale), and buttons 550 and 560 (e.g., user-interactive buttons offering the user an option of "No, Thanks" or an option of "Shop Now"). FIG. 6 illustrates an example in-application notification interface 600 presenting a different notification of a sale to the user while the user is using the application associated with "The Clothing Company." As shown in FIG. 6, client device 130 may display a background application user interface 610 (e.g., the application user interface for "The Clothing Company") and an in-application notification 620 (e.g., a notification providing information on a clothing sale for The Clothing Company). In-application notification 620 may include a hero portion 630 (e.g., an image associated with a fall season sale and a title of "Sale"), a body portion 640 (e.g., a background comprising a message to the user regarding the clothing sale), and buttons 650 and 660 (e.g., user-interactive buttons offering the user an option of "Yes Please" or an option of "No Thanks").

Figure 7:
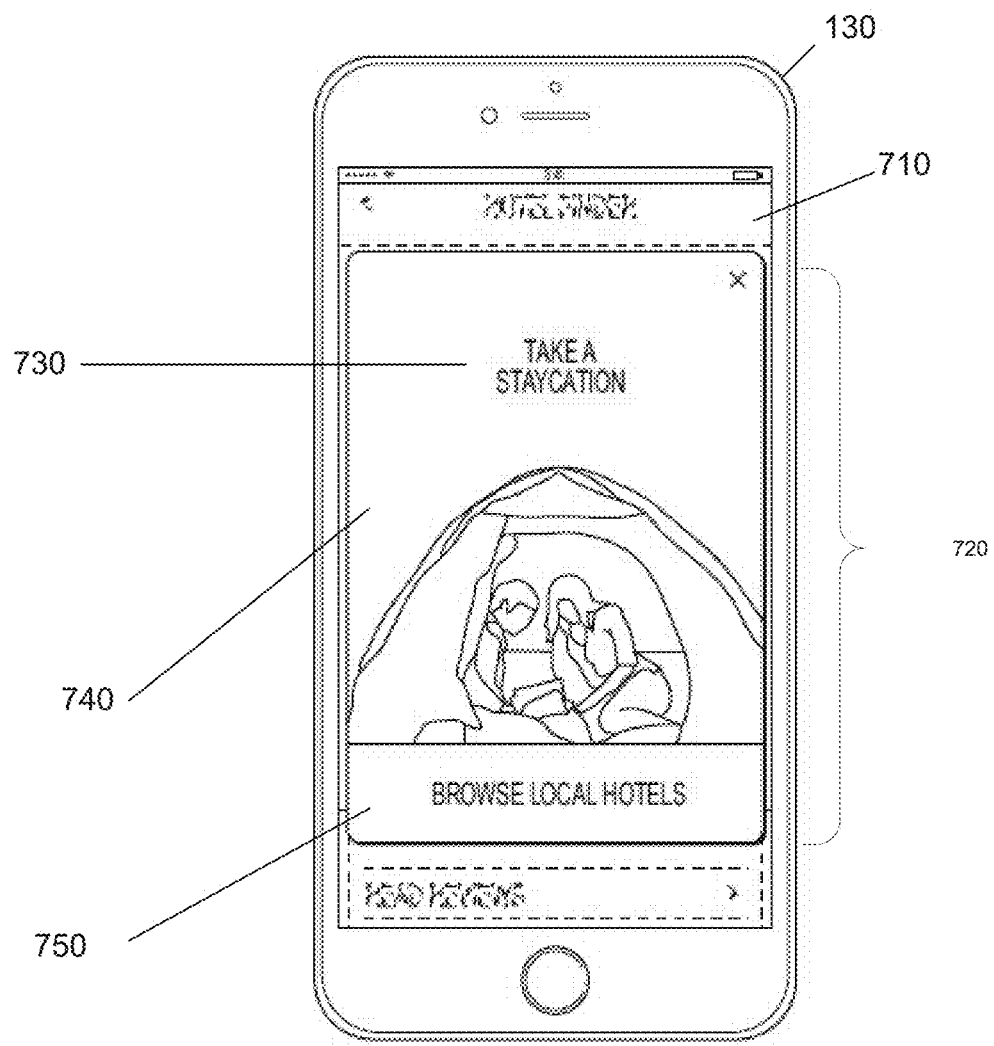
Figure 8:
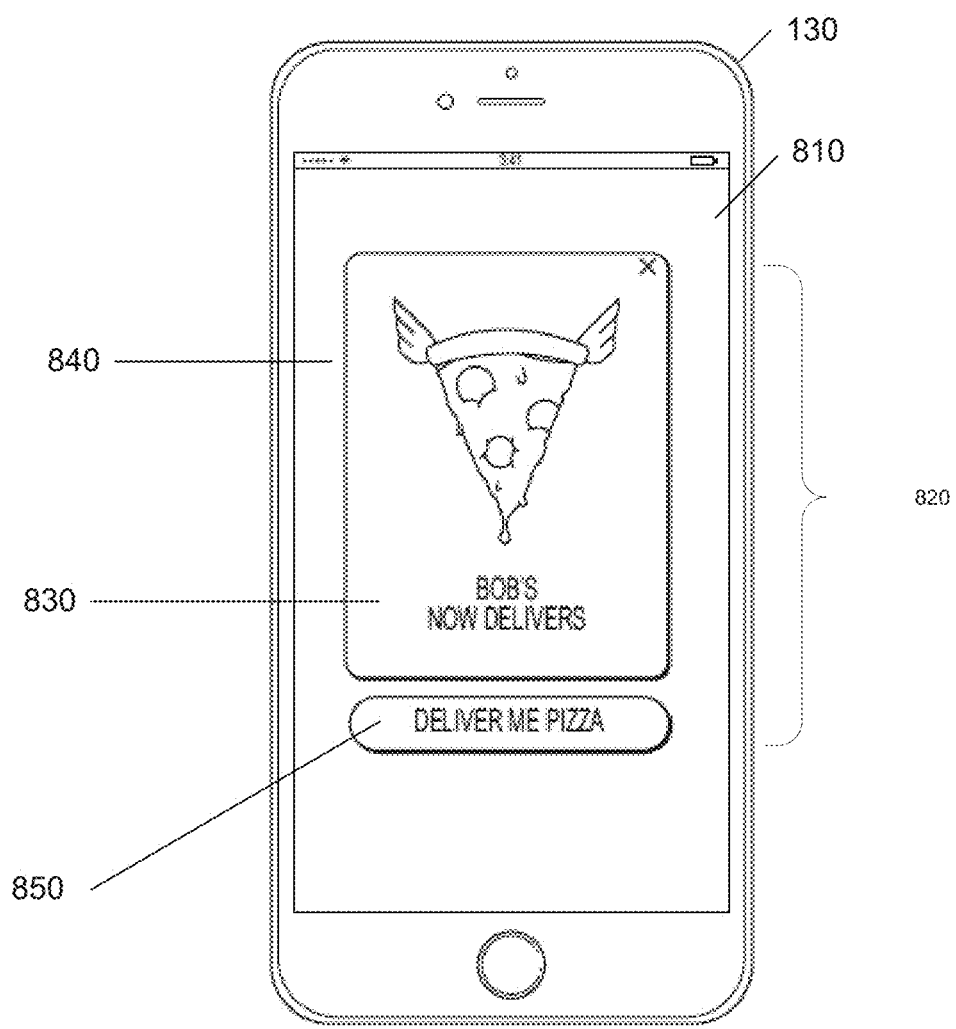
Figure 9:
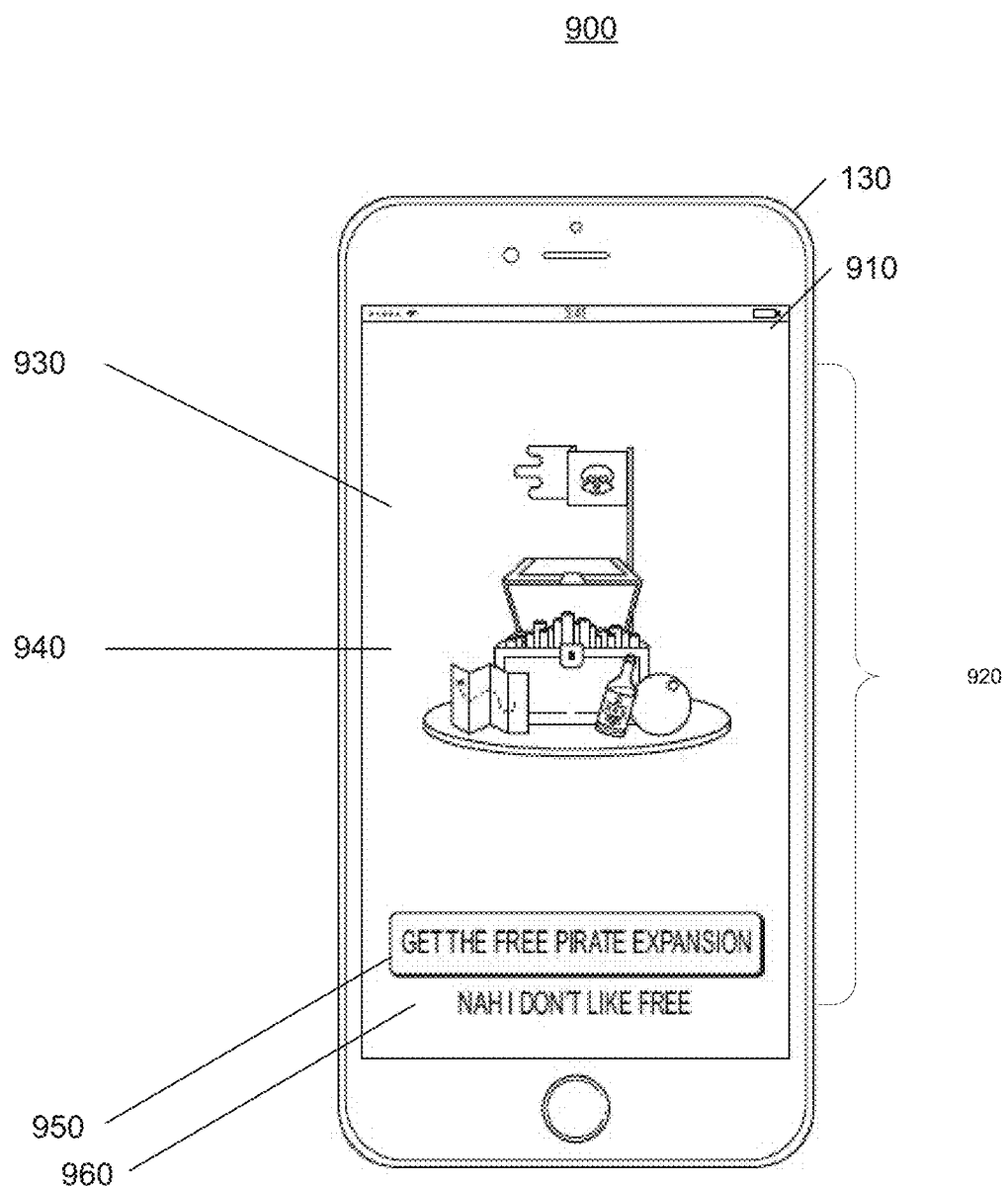

FIG. 7 illustrates an example in-application notification interface 700 presenting a notification of local hotel advertisements to the user while the user is using an application associated with "Hotel Finder." As shown in FIG. 7, client device 130 may display a background application user interface 710 (e.g., the application user interface for "Hotel Finder") and an in-application notification 720 (e.g., a notification providing the user with an opportunity to browse local hotels while the user is using the "Hotel Finder" application). In-application notification 720 may include a hero portion 730 (e.g., the title of "Take a Staycation"), a body portion 740 (e.g., a background image associated with the title), and button 750 (e.g., a user interactive button offering the user the option to go directly to browsing local hotels). FIG. 8 illustrates an example in-application notification interface 800 presenting a notification of an advertisement of pizza delivery options to the user while the user is using an application associated with "Bob's Pizza." As shown in FIG. 8, client device 130 may display a background application user interface 810 (e.g., which may be faded out completely when the in-application notification is shown on the user interface), and an in-application notification 820 (e.g., a notification providing the user with a notice that Bob's now delivers pizza). In-application notification 820 may include a hero portion 830 (e.g., the title of "Bob's Now Delivers"), a body portion 840 (e.g., a background image of a pizza), and a button 850 (e.g., a user interactive button offering the user the option to select "Deliver Me Pizza"). FIG. 9 illustrates an example in-application notification interface 900 presenting a notification of an application expansion package that the user may download while the user is using an application associated with the expansion package. As shown in FIG. 9, client device 130 may display a background application user interface 910 (e.g., which may be faded out completely when the in-application notification is shown on the user interface), and an in-application notification 920 (e.g., a notification providing the user with a notice that an expansion package is now available). In-application notification 920 may include a combined hero portion 930 and body portion 940 (e.g., a background image of a treasure chest that may be a main image and a background image corresponding to the pirate expansion package), and buttons 950 and 960 (e.g., interactive buttons offering the user the options of "Get the Free Pirate Expansion" or "Nah I Don't Like Free").

In particular embodiments, all three UI portions (e.g., the hero, the body, and the buttons) are completely customizable, including color options, images, styles, functions of the buttons, other customizable portion, or any combination thereof. As an example and not by way of limitation, the UI portions may be customized by an entity associated with an online social network (e.g., Facebook). As another example and not by way of limitation, the UI portions may be customized by a third-party entity (e.g., a developer) using the SDK associated with the online social network. In particular embodiments, this ability to customize the color options, images, styles, functions of buttons, and any other customizable portion allows the third-party entity (e.g., the third-party entity associated with the background application) to create in-application notifications that look and feel as if they part of the application itself while being created using the SDK associated with the online social network of the social-networking system. The push notifications are designed within an application composer (described below), which may allow for the developer to create the structured card and customize it based on any of the aspects described above and further described below. After the push notifications are designed, a platform (e.g., of a social-networking system) may deliver it to the client's mobile device to be displayed to the user.

In particular embodiments, the creator of the in-application notification (e.g., the online social network, third-party developer, etc.) may customize various timing and functionality aspects associated with the in-application notification displayed in the user interface of the application. As an example and not by way of limitation, the third-party developer may customize when the in-application notification is to be displayed to a user, including single-instance type display, continuous-campaign type display, event-based-campaign type display, re-engagement-campaign type display, other suitable display types, or any combination thereof. The single-instance type display may be used, for example, for an in-application notification of an event that occurs only once, and may be time sensitive (e.g., as shown in FIG. 4B of an event of limited duration and availability).

In particular embodiments, the instructions to display the notification may include instructions to display the notification for a predetermined number of times over a predetermined period of time. In particular embodiments, the one or more computing devices associated with the social-networking system may receive instructions from the third-party server to display the notification for a predetermined number of times over a predetermined period of time, and then send, by the one or more computing devices associated with the social-networking system, the notification to the mobile device for a predetermined number of times over a predetermined period of time based on the instructions received from the third-party server. This continuous-campaign type display maybe used for an event that the third-party developer wants to notify users of on a continuous basis (e.g., as shown in FIGS. 5 and 6 of a sales event for a clothing store).

In particular embodiments, the instructions to display the notification may include instructions to display the notification in response to a predetermined event associated with the user or with the application on the mobile device. In particular embodiments, the one or more computing devices associated with the social-networking system may receive instructions from the third-party server to display the notification in response to a predetermined event associated with the user or with the application on the mobile device, and then send, by the one or more computing devices associated with the social-networking system, the notification to the mobile device in response to receiving an indication of an occurrence of the predetermined event from the mobile device. This event-based-campaign type display may be used for a particular type of event (e.g., as shown in FIGS. 5 and 6 of a sales event for a clothing store).

In particular embodiments, the instructions to display the notification may include instructions to display the notification after a predetermined period of time of user inactivity associated with the application on the mobile device. In particular embodiments, the one or more computing devices associated with the social-networking system may receive instructions from the third-party server to display the notification after a predetermined period of time of user inactivity associated with the application on the mobile device, and then send, by the one or more computing devices associated with the social-networking system, the notification to the mobile device in response to receiving an indication of user inactivity for the predetermined period of time from the mobile device. This re-engagement-campaign type display maybe used to re-engage users/customers of the application that may not have interacted with or used the application in a while (e.g., as shown in FIG. 8, the application for Bob's Pizza may reach out to users who have not used the application in a while with an in-application notification that Bob's now delivers pizza; as shown in FIG. 9, the application for a pirate-based game may reach out to users who have not used the application in while with an in-application notification that the pirate-based game now has a free expansion packet).

As another example and not by way of limitation, the third-party developer may customize how long and how often the in-application notification is displayed in the user interface of the application. As yet another example and not by way of limitation, the third-party developer may customize who the in-application notification is sent to for display, such as sending to one single user, sending to all users associated with the application (e.g., which may be determined based on user identification keys associating the users with installation and/or registration of the application itself, as discussed below), sending to a select groups of users (e.g., users that have previously purchased items of clothing in a sale, users that have previously purchased a particular item that is now on sale, users that have previously indicated an interest in a particular item previously sold out but now available, etc.), or other suitable groups.

In particular embodiments, the method for delivering in-application notifications may include detecting a user interaction with the notification, and then sending information about the user interaction with the notification to a third-party server associated with the application. In particular embodiments, the method may further include instructions configured to display the notifications that are sent to the mobile device based on: a user interaction with the application on the mobile device, or a user interaction on the mobile device outside of the application. The creator of the in-application notification (e.g., the online social network, third-party developer, etc.) may customize what is displayed on the user interface with regard to the in-application notification in different user-interaction situations. As example and not by way of limitation, when the user is already interacting with or using the application associated with the in-application notification, the in-application notification may appear on the user interface as a structured card including buttons that may accept additional user interactions (e.g., as shown in FIGS. 5-7). As another example and not by way of limitation, when a user interacts with an in-app notification while not using the application associated with the in-application notification, the method may include receiving, from the one or more computing devices associated with the social-networking system, content for a second notification and second instructions to open the application and display the content of the second notification in the user interface of the application, and displaying a first interactive button associated with directly accessing the application for displaying the content for the second notification as a second structured card along with a second interactive button for bypassing the content for the second notification and the second instructions to open the application for display. The method may then include receiving a user input with the first interactive button associated with directly accessing the application, which would then initiate the opening of the application. Alternatively, the method may include receiving a user input with the second interactive button to bypass the content for the second notification. In this situation, the notification would simply be dismissed from the user interface. In addition, a user input interacting with the application to initiate the application for display is then received from the user (e.g., the user chose to open the application after dismissing the notification), and the application would then be opened to be displayed to the user without the structured card associated with the in-application notification that the user has previously dismissed.

Figure 10:
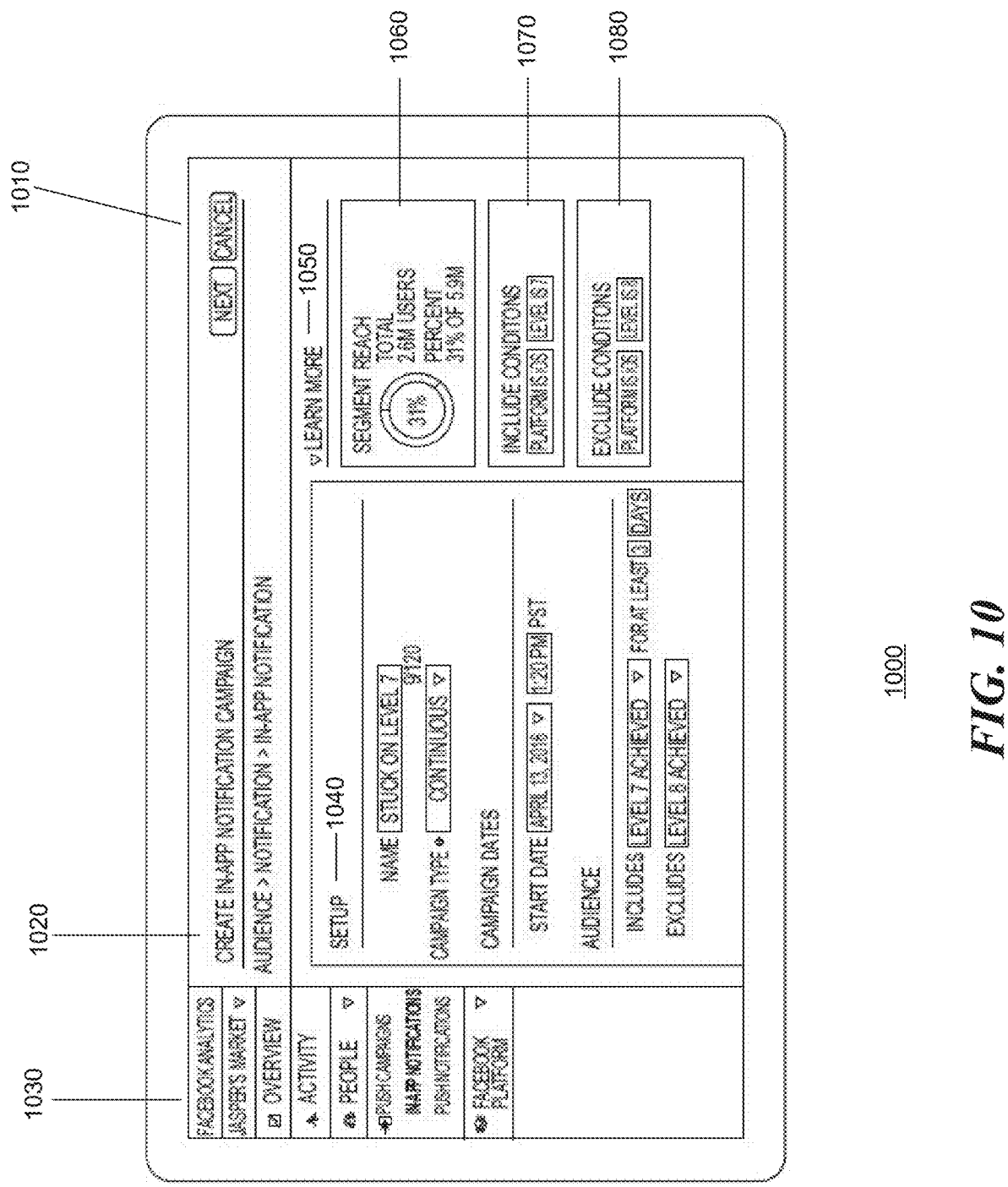
FIGS. 10-11 illustrate example user interfaces of a composer application to create in-application notifications.
Figure 11:
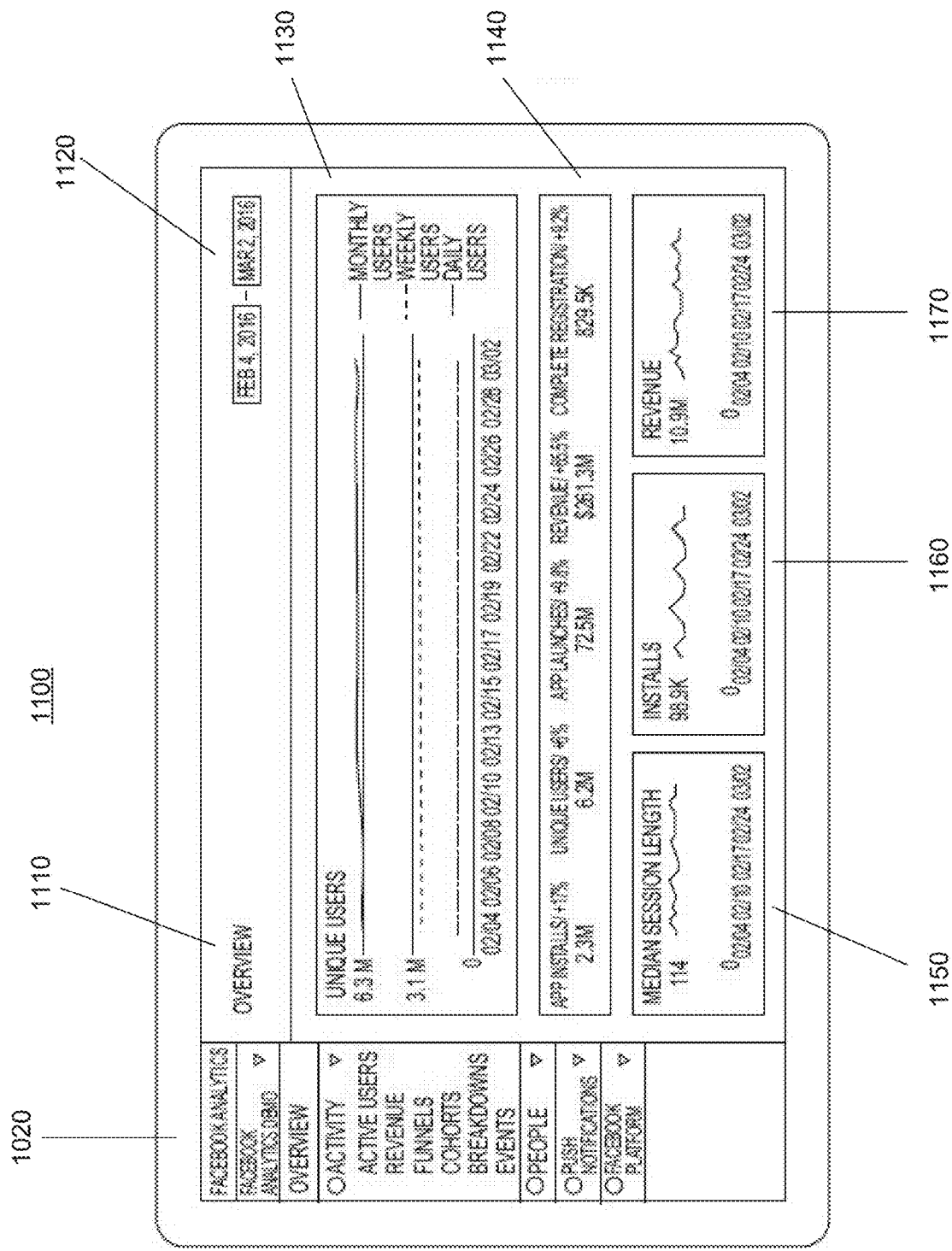

The in-applications notifications may be created using a composer (e.g., associated with a social-networking system) that is used to customize the various aspects of the notifications. FIGS. 10-11 illustrate example user interfaces of a composer application 1000 to create in-application notifications. As shown in FIG. 10, the composer application 1000 includes a composer user interface 1010, which includes a "create in-app notification campaign" section 1020 and an analytics section 1030. The "create in-app notification campaign" section 1020 includes a setup section 1040, which includes a naming section, a campaign-type selection (e.g., single instance, continuous campaign, event-based campaign, re-engagement-campaign, etc.), a campaign date-range selection, and an audience information section. The "create in-app notification campaign" section 1020 also includes a "learn more" section 1050, which further includes a "segment reach total number of users" section 1060, an "include conditions" section 1070, and an "exclude conditions" section 1080.

As shown in FIG. 11, the composer application 1000 may also include details on analytics associated with user interaction with the in-application notification. The composer application 1000 may include an overview section 1110 and the analytics section 1030. The overview section 1110 may include various section of detailed information associated with the in-application notification, including a section on unique users 1120, a section 1130 on statistics associated with application installs, unique users, application launches, revenue, and complete registration, a median session length section 1150, an installs section 1160, and a revenue section 1170.

In particular embodiments, the online social network may control and/or facilitate access and content exchange with various third-party entities (e.g., application developers) and their associated applications (e.g., Uber, The Clothing Co., Hotel Finder). As an example and not by way of limitation, the online social network may provide a means for creating content to be sent to the application associated with the third-party entities, and may also collect various data on user usage (e.g., application installs, number of unique users, application launches, revenue generated, completed registrations, etc.) from these applications. In particular embodiments, an installation identifier may be associated with the mobile device that links the mobile device to a particular user of the online social network. As an example and not by way of limitation, this installation identifier may be sent to the online social network when the user first downloads and installs the associated application. All installation identifiers associated with a particular application may be collected by the online social network into a database of installation identifiers. When in-application notifications are configured to be sent, the online social network, or the third-party entity via the online social network, may access this database in order to determine which users' mobile devices to send in-application notifications to. In particular embodiments, the instructions for displaying the in-application notification are sent to the mobile device upon verification by the online social network of an installation identifier associated with the mobile device as being associated with a particular user. As an example and not by way of limitation, the installer identifier may include information on one or more of a timestamp, an operating system of the mobile device, and social-networking information associated with the user. The information on the operating system of the mobile device (e.g., iOS, Windows, etc.) may be used to determine which version of the in-application notification to send to the mobile device so that it may be displayed correctly on the client device 130. In addition, the social-networking information associated with the user may be used to access and use all relevant user information stored on the social-networking system 160 (e.g., the user's interests, likes, dislikes, check-ins at particular locations, social network of friends and family, etc.). In particular embodiments, the online social network may send, to the third-party server, a request to register the application to receive notifications (e.g., a request to register the installation identifiers associated with the users), and receive confirmation of registration from the third-party server.

In particular embodiments, the payload (e.g., all of the components of the content of the in-application notification) that is sent to the mobile device is cached intelligently so that the display of the in-application notification on the mobile device of the user is as smooth as possible. In particular embodiments, the content for the notification may include a plurality of pieces of content, and the pieces may be received via a plurality of transmissions from the social-networking system 160 to the mobile device (e.g., client device 130). The mobile device may first confirm that all components of the payload (e.g., all components of the in-application notification) are loaded/cached locally onto the mobile device (e.g., on a local storage medium) before displaying or scheduling a time for displaying the push notification. As an example and not by way of limitation, the push notification may be scheduled to simply be displayed on the mobile device once local caching of the payload is complete. Alternatively, the payload may be linked to a local notification that is displayed on the mobile device once local caching of the payload is complete such that when the user clicks on the local notification, the mobile device then displays the payload information (e.g., in the form of an in-app notification). The payload information may also be delayed such that the push notification is display to the user only after certain selected timing (e.g., first thing Monday morning), certain events (e.g., when the user is using the associated app), continuous campaign situations (e.g., reminders to the user under certain situations), or re-engagement campaign situations (e.g., reminders to the user to use the app after a certain amount of inactivity).

A method for sending push notifications may include a first step of registering an app on a user's mobile device for push notifications to obtain a token and/or identifier (e.g., that identifies this app on this user's phone), and then sending this token and/or identifier to the developer so that the developer can use it to send notifications to the user. As a second step, the developer may craft a payload (e.g., a notification) matching the format specifications detailed by the composer, and then send the payload information to the operating system (e.g., iOS, Android, etc.) associated with the user's mobile device along with the token and/or identifier so that the payload can be sent to the user's mobile device. Once sent, the next step may be for the user's mobile device to download and process the payload information, which may deploy a caching mechanism (discussed above) and include generating a local notification on the user's mobile device (e.g., that is displayed on the lock screen) to notify the user of the push notification. Once the push notification is dismissed (e.g., by the user) or an action is taken (e.g., the user clicks on the notification), that information is passed back to the developer.

Figure 12:
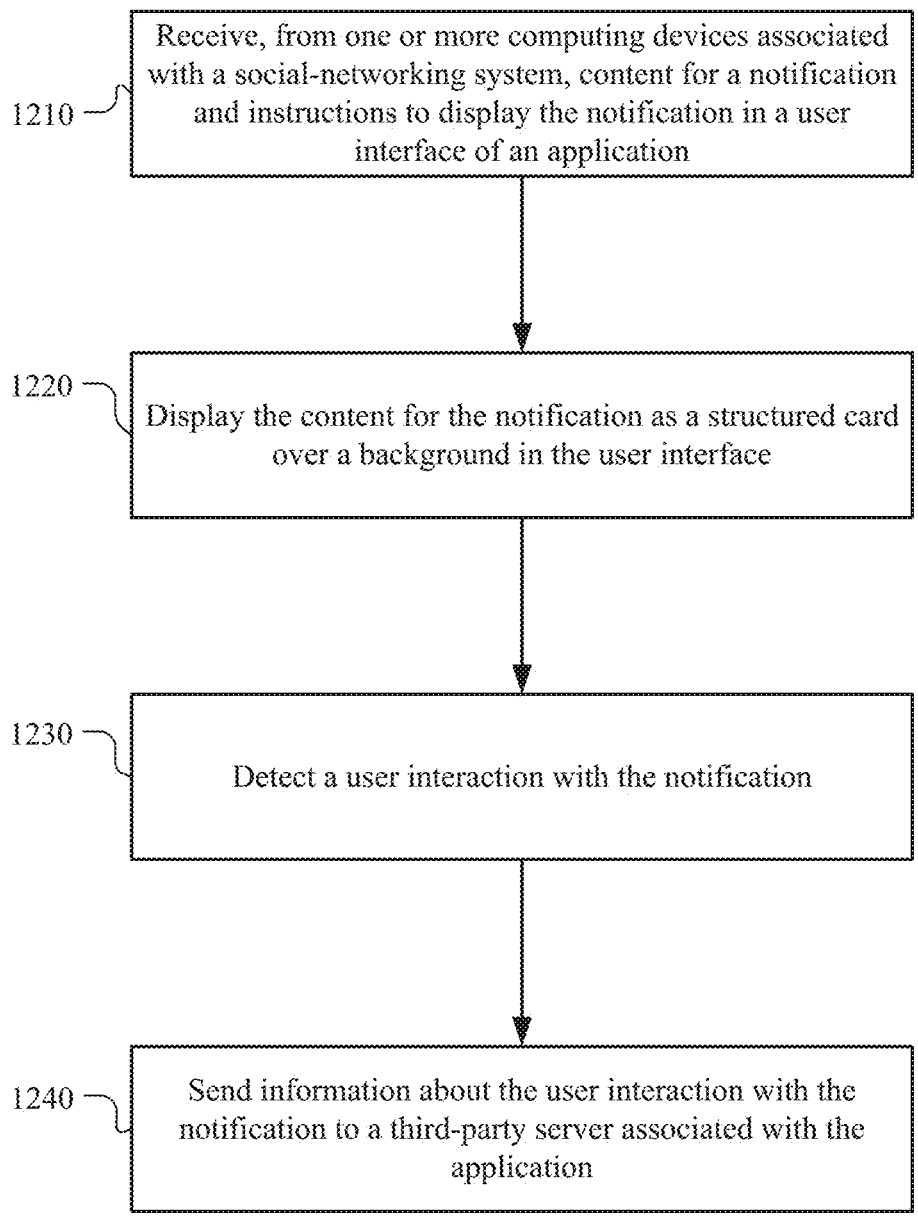
FIG. 12 illustrates an example method for displaying an in-application notification.

FIG. 12 illustrates an example method 1200 for displaying an in-application notification. The method may begin at step 1210, where a mobile device associated with a user may receive, from one or more computing devices associated with a social-networking system, content for a notification and instructions to display the notification in a user interface of the application. At step 1220, the mobile device associated with the user may display the content for the notification as a structured card over a background in the user interface. At step 1230, the mobile device associated with the user may detect a user interaction with the notification. Then, at step 1240, the mobile device associated with the user may send information about the user interaction with the notification to a third-party server associated with the application. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for displaying an in-application notification including the particular steps of the method of FIG. 12, this disclosure contemplates any suitable method for displaying an in-application notification including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
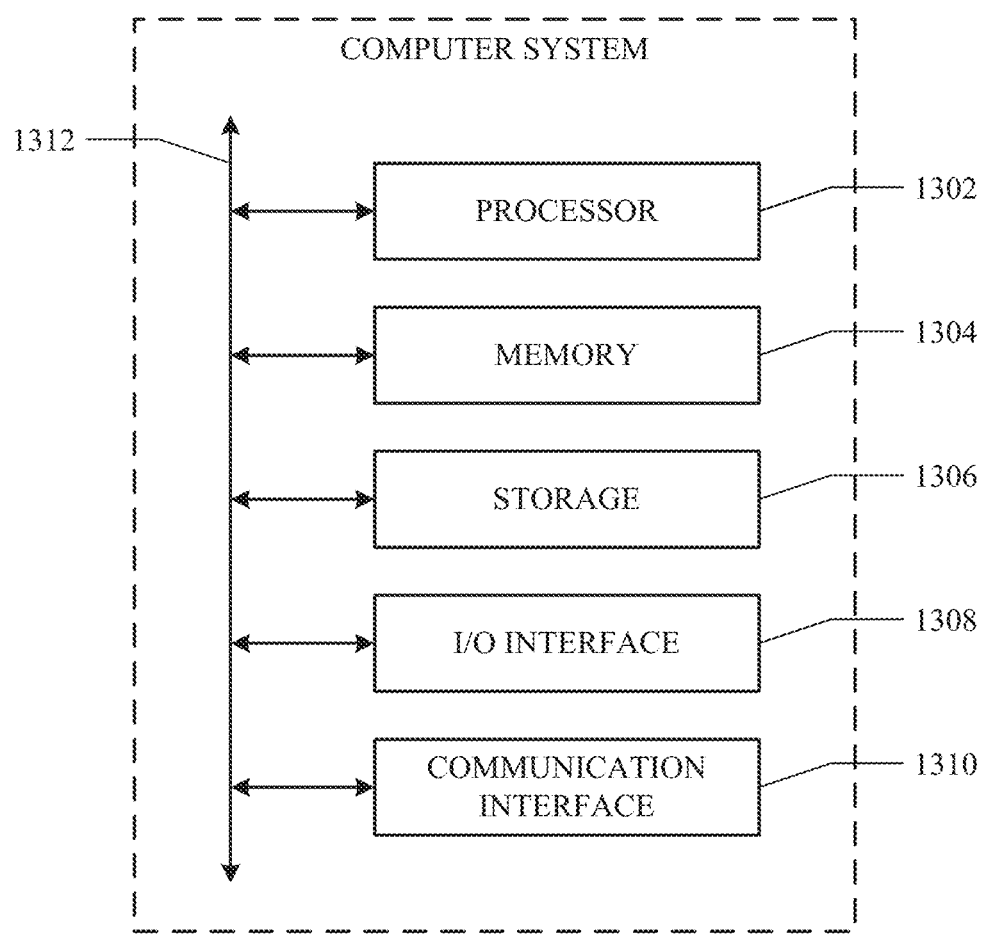
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a mobile device associated with a user:
   sending, from the mobile device to one or more computing devices, a request to receive notifications associated with a first application on the mobile device, wherein the request identifies at least the first application and the mobile device associated with the user;
   receiving, at the mobile device from the one or more computing devices, payload information comprising a plurality of pieces of content for a notification and format specification instructions to display the notification in a user interface of the first application, wherein the first application is not currently active in the user interface, and wherein the payload information is received in a plurality of transmissions to the mobile device and cached in a local storage medium of the mobile device;
   determining, by the mobile device, that all of the components of the payload information have been received and cached in the local storage medium;
   rendering, by the mobile device, after determining that all of the components of the payload information have been received and cached in the local storage medium, the notification for display in the user interface, wherein the notification is rendered locally based on the plurality of pieces of content and format specification instructions;
   displaying, by the mobile device, the rendered notification as a structured card over a second application in the user interface, wherein the second application is currently active in the user interface;
   detecting, by the mobile device, a user interaction with the notification; and
   sending, from the mobile device to the one or more computing devices, information about the user interaction with the rendered notification.

2. The method of claim 1, further comprising:
   accessing a social graph of an online social network comprising a plurality of nodes and a plurality of edges connecting the nodes, each of the edges between two of the nodes representing a single degree of separation between them, the nodes comprising:
      a plurality of content nodes corresponding to a plurality of content items associated with the online social network; and
      a plurality of entity nodes corresponding to a plurality of entities associated with the online social network, respectively;
   wherein the user is represented by a node of the social graph.

3. The method of claim 2, wherein the format specification instructions are received by the mobile device upon verification of an installation identifier associated with the mobile device as being associated with the user.

4. The method of claim 3, wherein the installation identifier comprises information on one or more of:
   a timestamp;
   an operating system of the mobile device; or
   social-networking information associated with the user.

5. The method of claim 1, wherein the structured card of the rendered notification comprises a title portion, a body portion, and one or more user-interactive-button portions.

6. The method of claim 1, wherein the format specification instructions configured to display the notification are sent to the mobile device based on:
   user interaction with the first application on the mobile device, or
   a user interaction on the mobile device outside of the first application.

7. The method of claim 1, wherein the displaying of the rendered notification is based on:
   the user's interaction with the first application, or
   the user's interaction on the mobile device outside of the first application.

8. The method of claim 1, wherein the format specification instructions to display the notification comprise instructions to display the notification for a predetermined number of times over a predetermined period of time.

9. The method of claim 1, wherein
   the one or more computing devices receive instructions from a first server to display the notification for a predetermined number of times over a predetermined period of time, and
   the one or more computing devices send the plurality of pieces of content for the notification to the mobile device for a predetermined number of times over a predetermined period of time based on the instructions received from the first server.

10. The method of claim 1, wherein the format specification instructions to display the notification comprise instructions to display the notification in response to a predetermined event associated with the user or with the first application on the mobile device.

11. The method of claim 1, wherein
   the one or more computing devices system receive instructions from the first server to display the notification in response to a predetermined event associated with the user or with the first application on the mobile device, and
   the one or more computing devices send the plurality of pieces of content for the notification to the mobile device in response to receiving an indication of an occurrence of the predetermined event from the mobile device.

12. The method of claim 1, wherein the format specification instructions to display the notification comprise instructions to display the notification after a predetermined period of time of user inactivity associated with the first application on the mobile device.

13. The method of claim 1, wherein
   the one or more computing devices receive instructions from the first server to display the notification after a predetermined period of time of user inactivity associated with the first application on the mobile device; and
   the one or more computing devices send the plurality of pieces of content for the notification to the mobile device in response to receiving an indication of user inactivity for the predetermined period of time from the mobile device.

14. The method of claim 1, further comprising:
caching the plurality of pieces of content in the local storage medium of the mobile device.

15. The method of claim 1, further comprising:
sending, to the first server, a request to register the first application to receive notifications; and
receiving confirmation of registration from the first server.

16. The method of claim 1, further comprising:
receiving, from the one or more computing devices, a plurality of pieces of content for a second notification and second format specification instructions to open the first application and display the second rendered notification in the user interface of the first application;
displaying a first interactive button associated with directly accessing the first application for displaying the second rendered notification as a second structured card along with a second interactive button for bypassing the second rendered notification and the second format specification instructions to open the first application for display;
receiving a first user input interacting with the second interactive button to bypass the second rendered notification;
receiving a second user input interacting with the first application to initiate the first application for display; and
displaying the user interface of the first application, wherein the user interface does not comprise the second structured card.

17. One or more computer-readable non-transitory storage media embodying software that is operable when executed to:
send, from a mobile device associated with a user to one or more computing devices, a request to receive notifications associated with a first application on the mobile device, wherein the request identifies at least the first application and the mobile device associated with the user;
receive, at the mobile device from the one or more computing devices, payload information comprising a plurality of pieces of content for a notification and format specification instructions to display the notification in a user interface of the first application, wherein the first application is not currently active in the user interface, and wherein the payload information is received in a plurality of transmissions to the mobile device and cached in a local storage medium of the mobile device;
determine, by the mobile device, that all of the components of the payload information have been received and cached in the local storage medium;
render, by the mobile device, after determining that all of the components of the payload information have been received and cached in the local storage medium, the notification for display in the user interface, wherein the notification is rendered locally based on the plurality of pieces of content and format specification instructions;
display, by the mobile device, the rendered notification as a structured card over a second application in the user interface, wherein the second application is currently active in the user interface;
detect, by the mobile device, a user interaction with the notification; and
send, from the mobile device to the one or more computing devices, information about the user interaction with the rendered notification.

18. A system comprising: one or more processors; and a memory coupled to the processors comprising instructions executable by the processors, the processors operable when executing the instructions to:
send, from a mobile device associated with a user to one or more computing devices, a request to receive notifications associated with a first application on the mobile device, wherein the request identifies at least the first application and the mobile device associated with the user;
receive, at the mobile device from the one or more computing devices, payload information comprising a plurality of pieces of content for a notification and format specification instructions to display the notification in a user interface of the first application, wherein the first application is not currently active in the user interface, and wherein the pay load information is received in a plurality of transmissions to the mobile device and cached in a local storage medium of the mobile device;
determine, by the mobile device, that all of the components of the payload information have been received and cached in the local storage medium;
render, by the mobile device, after determining that all of the components of the payload information have been received and cached in the local storage medium, the notification for display in the user interface, wherein the notification is rendered locally based on the plurality of pieces of content and format specification instructions:
display, by the mobile device, the rendered notification as a structured card over a second application in the user interface, wherein the second application is currently active in the user interface;
detect, by the mobile device, a user interaction with the notification; and
send, from the mobile device to the one or more computing devices, information about the user interaction with the rendered notification.

19. The method of claim 1, wherein the one or more computing devices are servers of a social-networking system, and wherein the first application is associated with the first server that is separate from the servers of the social-networking system.

20. The method of claim 1, wherein each piece of content of the plurality of pieces of content is based on social-networking data of the user.

21. The method of claim 1, wherein the first application is not visible in the user interface.

22. The method of claim 1, wherein the second application is visible in the user interface.

23. The method of claim 1, wherein the second application is the operating system of the client device.

24. The method of claim 1, further comprising:
determining, by the mobile device, that all of the components of the payload information have been received and cached at the mobile device,
wherein rendering the notification for display is responsive to determining that all of the components of the payload information have been received and cached.

25. The method if claim 1, wherein the user is a user associated with an online social network.

26. The method of claim 1, wherein the information about the user interaction with the notification is sent to a third-party server via the one or more computing devices.

* * * * *